United States Patent
Taillon et al.

(10) Patent No.: US 11,706,278 B2
(45) Date of Patent: Jul. 18, 2023

(54) PRIORITIZED MSRP TRANSMISSIONS TO REDUCE TRAFFIC INTERRUPTIONS

(71) Applicant: Cisco Technology, Inc., San Jose, CA (US)

(72) Inventors: Michel D. Taillon, Stittsville (CA); Gayathri R, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/678,643

(22) Filed: Feb. 23, 2022

(65) Prior Publication Data
US 2022/0201062 A1    Jun. 23, 2022

Related U.S. Application Data

(63) Continuation of application No. 17/129,542, filed on Dec. 21, 2020, now Pat. No. 11,290,516.

(51) Int. Cl.
*H04L 65/80* (2022.01)
*H04L 47/724* (2022.01)
(Continued)

(52) U.S. Cl.
CPC .......... *H04L 65/80* (2013.01); *H04L 12/4641* (2013.01); *H04L 47/6215* (2013.01);
(Continued)

(58) Field of Classification Search
CPC ................ H04L 65/80; H04L 12/4641; H04L 47/6215; H04L 47/724; H04L 65/61; H04L 65/65; H04L 65/70
See application file for complete search history.

(56) References Cited

U.S. PATENT DOCUMENTS 7,729,258 B2    6/2010  Ezawa et al.
8,588,189 B2    11/2013 Lee et al.
(Continued)

OTHER PUBLICATIONS

Final Office Action for U.S. Appl. No. 17/129,542 dated Oct. 6, 2021, Michel D. Taillon, "Prioritized MSRP Transmissions To Reduce Traffic Interruptions", 13 pages.
(Continued)

*Primary Examiner* — Jonathan A Bui
(74) *Attorney, Agent, or Firm* — Lee & Hayes, P.C.

(57) ABSTRACT

This technology enables prioritization of Multiple Stream Reservation Protocol ("MSRP") transmissions in Audio Video Bridging ("AVB") virtual local area networks ("VLANs"). An AVB switch receives a status from listener devices, associates a state with each of the statuses indicating whether each listener device is active or in-active, and stores each state in a database. For each listener device, a queue of MSRP protocol data unit ("PDU") packets exists to be transmitted to the listener device. The AVB switch searches the database for listener devices with an active state, searches the queue for each active listener device for packets associated with an active state, and transmits the packets associated with the active state to each active listener device. Subsequently, the AVB switch searches each listener device's queue for packets associated with an in-active state and transmits the packets associated with an in-active state to each listener device.

20 Claims, 6 Drawing Sheets

(51) Int. Cl.
*H04L 12/46* (2006.01)
*H04L 47/62* (2022.01)
*H04L 65/61* (2022.01)
*H04L 65/65* (2022.01)
*H04L 65/70* (2022.01)

(52) U.S. Cl.
CPC ............ *H04L 47/724* (2013.01); *H04L 65/61* (2022.05); *H04L 65/65* (2022.05); *H04L 65/70* (2022.05)

(56) References Cited

U.S. PATENT DOCUMENTS

| | | | |
|---|---|---|---|
| 8,730,983 | B1 | 5/2014 | Akhter et al. |
| 2002/0099854 | A1 | 7/2002 | Jorgensen |
| 2003/0158913 | A1* | 8/2003 | Agnoli ............... H04L 67/1012 709/224 |
| 2003/0202525 | A1 | 10/2003 | Nagatomo |
| 2008/0320166 | A1 | 12/2008 | Filsfils et al. |
| 2009/0135724 | A1* | 5/2009 | Zhang ................. H04L 41/5025 370/241 |
| 2010/0040077 | A1 | 2/2010 | Maze et al. |
| 2010/0105332 | A1 | 4/2010 | McHenry et al. |
| 2010/0232370 | A1 | 9/2010 | Jing et al. |
| 2011/0310738 | A1* | 12/2011 | Lee .................... H04W 28/0289 370/235 |
| 2011/0310907 | A1 | 12/2011 | Klein et al. |
| 2012/0213230 | A1 | 8/2012 | Fan et al. |
| 2012/0284739 | A1 | 11/2012 | Gunther et al. |
| 2012/0314597 | A1 | 12/2012 | Singh et al. |
| 2013/0339483 | A1 | 12/2013 | Olsen et al. |
| 2014/0282776 | A1* | 9/2014 | De Vriendt ...... H04N 21/26216 725/109 |
| 2015/0009874 | A1 | 1/2015 | Edara et al. |
| 2015/0044658 | A1* | 2/2015 | Jackson ........... H04N 21/43635 434/308 |
| 2015/0156134 | A1* | 6/2015 | Nobauer ............... H04L 47/724 370/445 |
| 2016/0006661 | A1 | 1/2016 | Wei |
| 2016/0191597 | A1 | 6/2016 | Joy et al. |
| 2017/0264556 | A1 | 9/2017 | Varga et al. |
| 2018/0176816 | A1 | 6/2018 | Meylan et al. |
| 2018/0191642 | A1 | 7/2018 | Biederman et al. |
| 2019/0058650 | A1 | 2/2019 | Gunther |
| 2019/0066482 | A1 | 2/2019 | Ganster |

OTHER PUBLICATIONS

Office Action for U.S. Appl. No. 17/129,542 dated Jul. 1, 2021, Michel D. Taillon, "Prioritized MSRP Transmissions To Reduce Traffic Interruptions", 11 pages.
Pearson, "Stream Reservation Protocol", AVnu Alliance Best Practices, Nov. 3, 2014, 21 Pages.

* cited by examiner

PRIORITIZED MSRP TRANSMISSIONS TO REDUCE TRAFFIC INTERRUPTIONS

RELATED APPLICATIONS

This application claims priority to and is a continuation of U.S. patent application Ser. No. 17/129,542, filed on Dec. 21, 2020, the entire contents of which are incorporated herein by reference.

TECHNICAL FIELD

This disclosure relates to reducing traffic interruptions, and more particularly, to prioritize Multiple Stream Reservation Protocol ("MSRP") transmissions in Audio Video Bridging ("AVB") virtual local area networks ("VLANs").

BACKGROUND

In a conventional Audio Video Bridging ("AVB") virtual local area network ("VLAN"), talker device attributes are used to advertise the availability of audio/video streams and are propagated throughout the VLAN. Listener device attributes are used to subscribe to the advertised streams and are transmitted to a particular talker device.

AVB traffic within the VLAN includes MSRP protocol data unit ("PDU") packets, which encode states associated with both talker and listener devices. The majority of MSRP PDU packets are associated with talker device attributes advertising the availability of streams. End point devices associated with listener devices receive MSRP PDU packet transmissions with talker device attributes as well as MSRP PDU packets comprising subscribed streams. During replay, end point devices are required to process all of the MSRP PDU packets, including advertisements, to ensure the streams to which they are subscribed are available. The end point devices may be overwhelmed with the quantity of MSRP PDU packets and may drop the MSRP PDU packets associated with the subscribed stream, thereby causing the stream from the talker device to erroneously time out.

DETAILED DESCRIPTION

Overview

Figure 1:
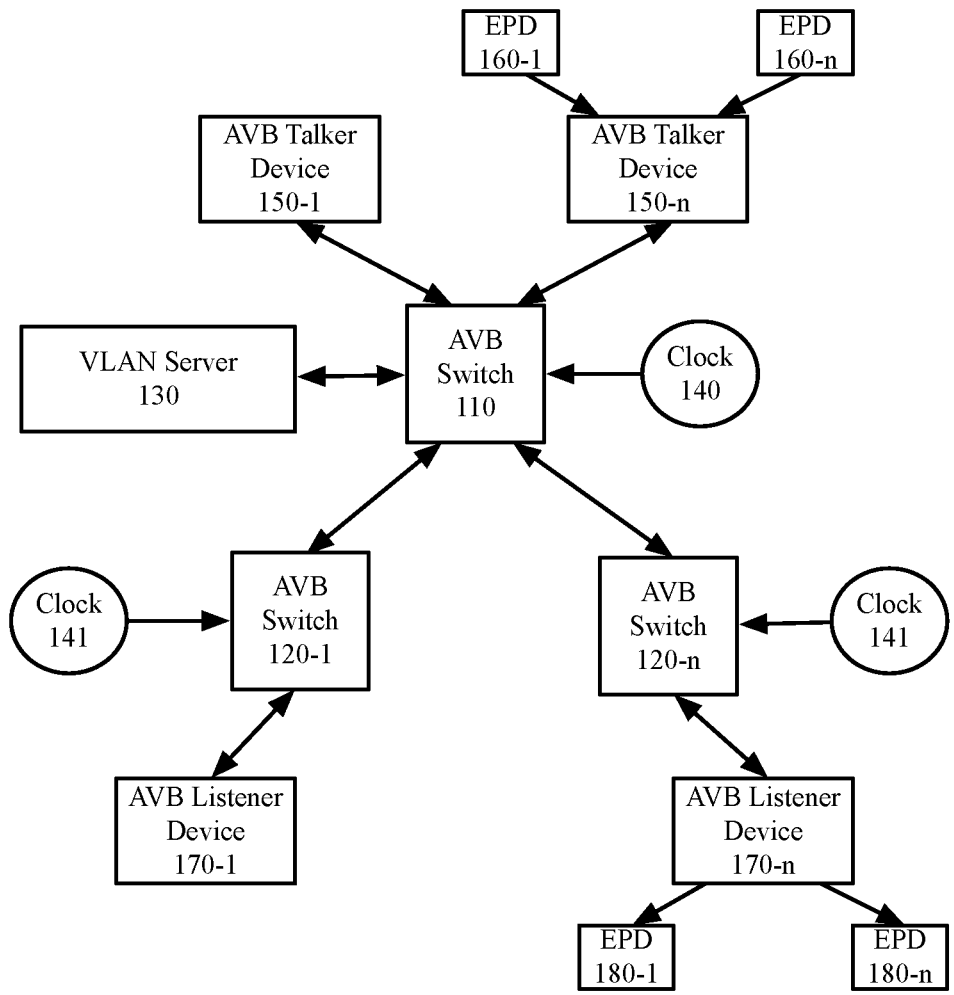
FIG. 1 is a block diagram depicting an Audio Video Bridging ("ARB") network system, in accordance with certain examples.

The present technology allows prioritization of Multiple Stream Reservation Protocol ("MSRP") transmissions in Audio Video Bridging ("AVB") virtual local area networks ("VLANs").

An AVB VLAN may comprise multiple talker devices, multiple listener devices, and multiple AVB switches or bridges connecting the talker devices and the listener devices. The multiple talker devices transmit talker attributes across the VLAN. Talker attributes are relatively large and are used to advertise the availability of an audio/video ("AV") stream. Talker attributes are propagated throughout the entire VLAN. The multiple listener devices produce listener attributes. The listener attributes are used to subscribe to advertised streams and are transmitted to a particular talker device. Under moderate scale, several MSRP protocol data units ("PDUs") may be required to encode all of the states associated with the talker and listener device attributes, with the majority of the MSRP PDUs comprising the talker attributes. The present technology prioritizes subscribed or active streams and replays the state for streams first. The active state is transmitted first after a leave all event in a deterministic manner, as opposed to important and active states being distributed across multiple PDUs in an indeterministic manner.

For each of the multiple talker devices, the talker device broadcasts a talker advertise message across the VLAN. The talker device may repeatedly broadcast the talker advertise message at scheduled intervals. An AVB switch receives and stores the broadcast talker advertise message and determines if sufficient resources are available to transmit a stream associated with the talker advertise message. Upon a determination that sufficient resources are present, the AVB switch transmits the talker advertise message to the listener devices within the VLAN.

The AVB switch receives, from one or more of the listener devices within the VLAN, a status associated with each of the responding listener devices. The AVB switch associates a state with each of the received statuses and stores each state in a database. In response to receiving a talker advertise message, a particular listener device may transmit a "ready" status, indicating that the particular listener device is subscribing to the stream associated with the talker advertise message. The AVB switch may store an "active" state for each listener device replying with a "ready" status. A listener device previously subscribing to a stream from a talker device may transmit a "de-register" status indicating the listener device is unsubscribing from the talker device stream. In this event, the AVB switch device may replace a previously stored "active" state for the listener device with an "in-active" state. For listener devices not replying with a "ready" or "de-register" status, the AVB switch may store an "in-active" state.

For each listener device within the VLAN, a queue exists of MSRP protocol data unit ("PDU") packets to be transmitted to the listener device. The queue may be stored in the database with the state of each listener device. The MSRP PDU packets may comprise talker advertise messages from the multiple talker devices within the VLAN and/or subscribed streams. The AVB switch searches the database for listener devices with an active state. The AVB switch then searches the queue for each active listener device for packets associated with an active state, for example, MSRP PDU packets comprising a subscribed stream. The AVB switch transmits the MSRP PDU packets associated with the active state for each active listener device to each active listener device. The AVB switch then searches each active listener device's queue for packets associated with an in-active state for each listener device, for example, MSRP PDU packets comprising a talker advertise message. The AVB switch subsequently transmits the packets associated with an in-active state to each active listener device. The AVB switch searches the database for listener devices with an in-active state. The AVB switch then transmits the MSRP PDU packets within the in-active listener device's queue to each in-active listener device.

The present technology allows prioritized MSRP transmissions to reduce traffic interruptions. This technology prioritizes active/subscribed streams and replays the state for transmissions comprising active/subscribed streams first. The active/subscribed streams are sent first after a leave all event while in-active/unsubscribed advertisements are held off as to not compete with active state replay. This technology enables an AVB switch to transmit MSRP PDU packets associated with an active state to active listener devices prior to transmitting packets associated with an in-active state. By prioritizing the transmission of active MSRP PDU packets over in-active packets, listener devices receive MSRP PDU packets in a deterministic manner, which minimizes VLAN traffic interruptions. The reliability and the scale of the MSRP is increased.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

FIG. 1 is a block diagram depicting an Audio Video Bridging ("AVB") network system 100, in accordance with certain examples. The depicted and non-depicted components of the AVB network system 100 are compliant with IEEE 802.1 AVB standards. As depicted in FIG. 1, the AVB network system 100 comprises an AVB switch 110, intermediate AVB switches 120-1 through 120-n, a virtual local area network ("VLAN") server 130, a clock 140, clocks 141, AVB talker devices 150-1 through 150-n, end point devices 160-1 through 160-n, AVB listener devices 170-1 through 170-n, and end point devices 180-1 through 180-n.

The AVB network system 100 comprises an AVB switch 110. The AVB switch 110 is a bridge or network hub to which each AVB talker device 150 and AVB listener device 170 is connected. The AVB switch 110 uses Layer 2 routing technology. In an example, the AVB switch 110 functions to receive multiple stream reservation protocol ("MSRP") protocol data unit ("PDU") packets from source devices, such as AVB talker devices 150, and forward the MSRP PDU packets to receiving devices, such as AVB listener devices 170. Alternatively, the AVB switch 110 may forward the packets to one or more intermediate AVB switches 120. As a Layer 2 device, the AVB switch 110 uses media access control ("MAC") addresses to establish routes between source and receiving devices.

The AVB switch 110 comprises multiple ports that can be used for AVB and non-AVB traffic. The IEEE 802.1 AVB standards prioritize audio/video traffic within a VLAN. If an AVB device is connected to a port of the AVB switch 110, up to 75% of the bandwidth of the port is allocated to AVB traffic. If no AVB device is connected to a port, all of the bandwidth of the port is available for regular network traffic.

The AVB switch 110 may be a core, central, or master switch through which all AVB traffic in the VLAN is routed.

The AVB switch 110 may comprise a storage device and a processor, not depicted. The AVB switch 110 may store states associated with AVB listener devices 170 and transmission queues in a database in the storage device.

The AVB switch 110 may be in communication with AVB talker devices 150, intermediate AVB switches 120, VLAN server 130, and AVB listener devices 170 via a wired or wireless telecommunication mechanism.

The AVB network system 100 may comprise one or more intermediate AVB switches 120-1 through 120-n. Intermediate AVB switches 120 may function as intermediate AVB switches between AVB switch 110 and AVB listener devices 170. Each intermediate AVB switch 120 functions in a similar manner to previously described AVB switch 110. Intermediate AVB switches 120 receive MSRP PDU packets from AVB switch 110 and forward the MSRP PDU packets to additional intermediate AVB switches 120 (not depicted) or to AVB listener devices 170. In an alternate example (not depicted), the AVB network system 100 may not comprise intermediate AVB switches 120 and only comprise AVB switch 110 as a central switch within the VLAN.

The AVB network system 100 may comprise a VLAN server 130. The VLAN server 130 may be in communication with AVB switch 110. The VLAN server 130 may function to provide storage or processing services for AVB switch 110. In an alternate example (not depicted), the AVB network system 100 may not comprise a VLAN server 130.

The AVB network system 100 comprises a clock 140 and one or more clocks 141. The clock 140 may be a separate component of the AVB network system 100, as depicted, or the clock 140 may be an internal component of AVB switch 110. Similarly, clocks 141 may be a separate component of the AVB network system 100 for each AVB switch 120, or the clocks 141 may be an internal component of the AVB switches 120. The clock 140 and clocks 141 are synchronized to ensure consistent delivery of time-sensitive audio video ("AV") streams. Clock 140 and clocks 141 may be virtual clocks.

The AVB network system 100 comprises one or more AVB talker devices 150-1 through 150-n. AVB talker devices 150 are end stations that are the source or producer of an AV stream. For example, an AVB talker device 150 may be a microphone, a video camera, or any suitable device capable of producing an audio and/or video stream. Each AVB talker device 150 may transmit one or more AV streams to AVB network system 100. In an example, one or more AVB talker devices 150 may function as both a talker device and a listener device, similar to AVB listener devices 170. For example, an AVB talker device 150 may be capable of producing one or more AV streams while simultaneously broadcasting/displaying an AV stream received from a second AVB talker device 150.

The AVB network system 100 may comprise one or more end point devices ("EPDs") 160-1 through 160-n. The EPDs 160 may be connected to an AVB talker device 150. The EPDs 160 are a source or producer of an AV stream. For example, EPDs 160 may be multiple microphones connected to an AVB talker device 150.

The AVB network system 100 comprises one or more AVB listener devices 170-1 through 170-n. The AVB listener devices 170 are end stations that are the destination or consumer of an AV stream. For example, an AVB listener device 170 may be a speaker, a video screen, a monitor, a television, or any suitable device capable of receiving and broadcasting/displaying an audio and/or video stream. Each AVB listener device 170 may receive one or more AV streams from one or more AVB talker devices 150 via AVB network system 100. In an example, one or more AVB listener devices 170 may function as both a talker device and a listener device, similar to AVB talker devices 150.

The AVB network system 100 may comprise one or more end point devices ("EPDs") 180-1 through 180-*n*. The EPDs 180 may be connected to an AVB listener device 170. The EPDs 180 are a destination or consumer of an AV stream. For example, EPDs 180 may be multiple speakers connected to an AVB listener device 170.

The AVB network system 100 includes a wired or wireless telecommunication mechanism by which network devices (including AVB switches 110 and 120, VLAN server 130, AVB talker devices 150, EPDs 160 and 180, and AVB listener devices 170) can communicate and exchange data. Each AVB network system 100 can include, be implemented as, or may be a part of, a wired or wireless communication network, cloud computing environment, or any other appropriate architecture or system that facilitates the communication of signals, data, and/or messages (generally referred to as data). For example, AVB network system 100 may include one or more of a local area network ("LAN"), a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, a BLUETOOTH® wireless technology connection, a near field communication ("NEC") connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Figure 6:
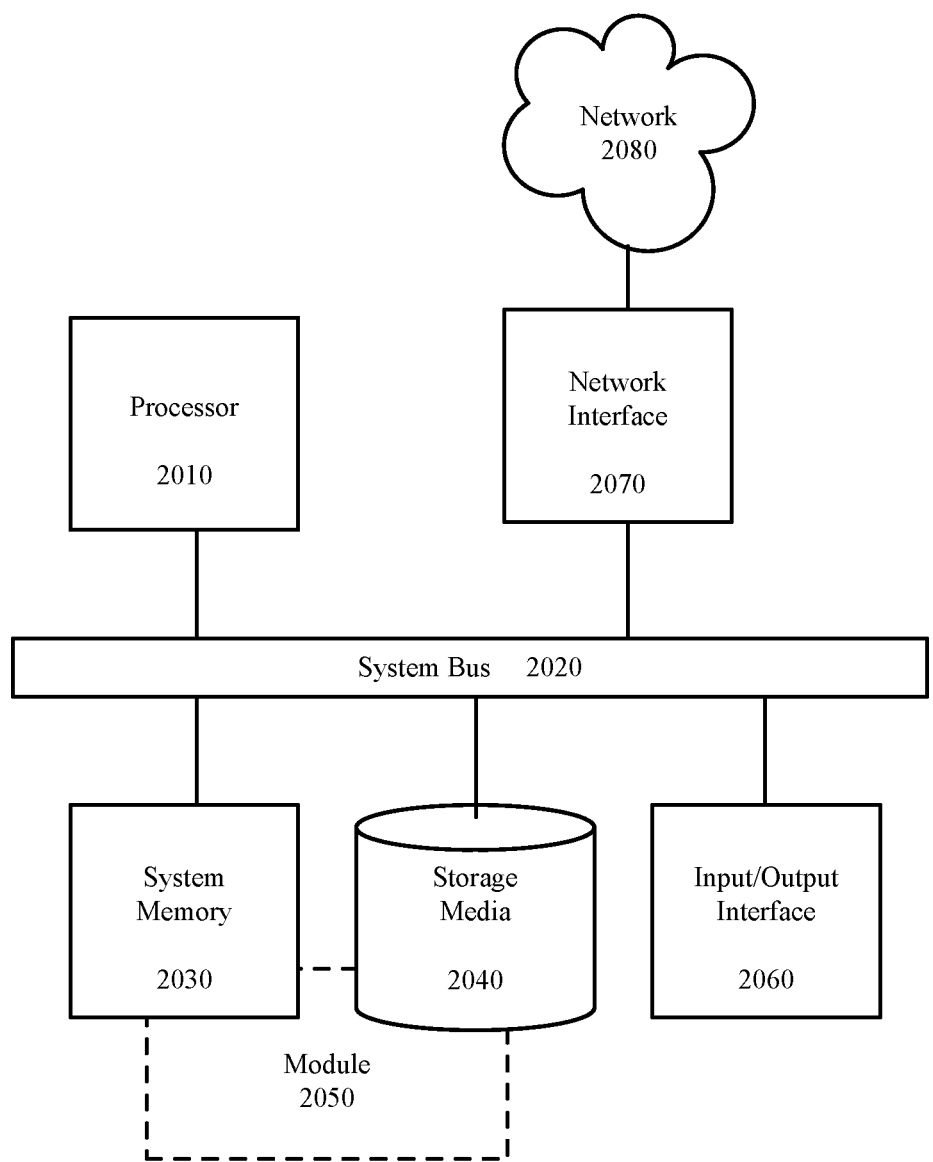
FIG. 6 is a block diagram depicting a computing machine and a module, in accordance with certain examples.

The network computing devices and any other computing machines associated with the technology presented herein may be any type of computing machine, such as, but not limited to, those discussed in more detail with respect to FIG. 6. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks. Each network may include various types of data or communications networks, including any of the network technology discussed with respect to FIG. 6.

Furthermore, any modules associated with any of these computing machines, such as modules described herein or any other modules (scripts, web content, software, firmware, or hardware) associated with the technology presented herein may be any of the modules discussed in more detail with respect to FIG. 6.

The network connections illustrated are examples and other means of establishing a communications link between the computers and devices can be used. Moreover, those having ordinary skill in the art having the benefit of the present disclosure will appreciate that the devices illustrated in FIG. 1 may have any of several other suitable computer system configurations.

Example Processes

The methods illustrated in FIGS. 2 through 5 are described hereinafter with respect to the components of AVB network system 100. The methods of FIGS. 2 through 5 may also be performed with other systems and in other environments. The operations described with respect to FIGS. 2 through 5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
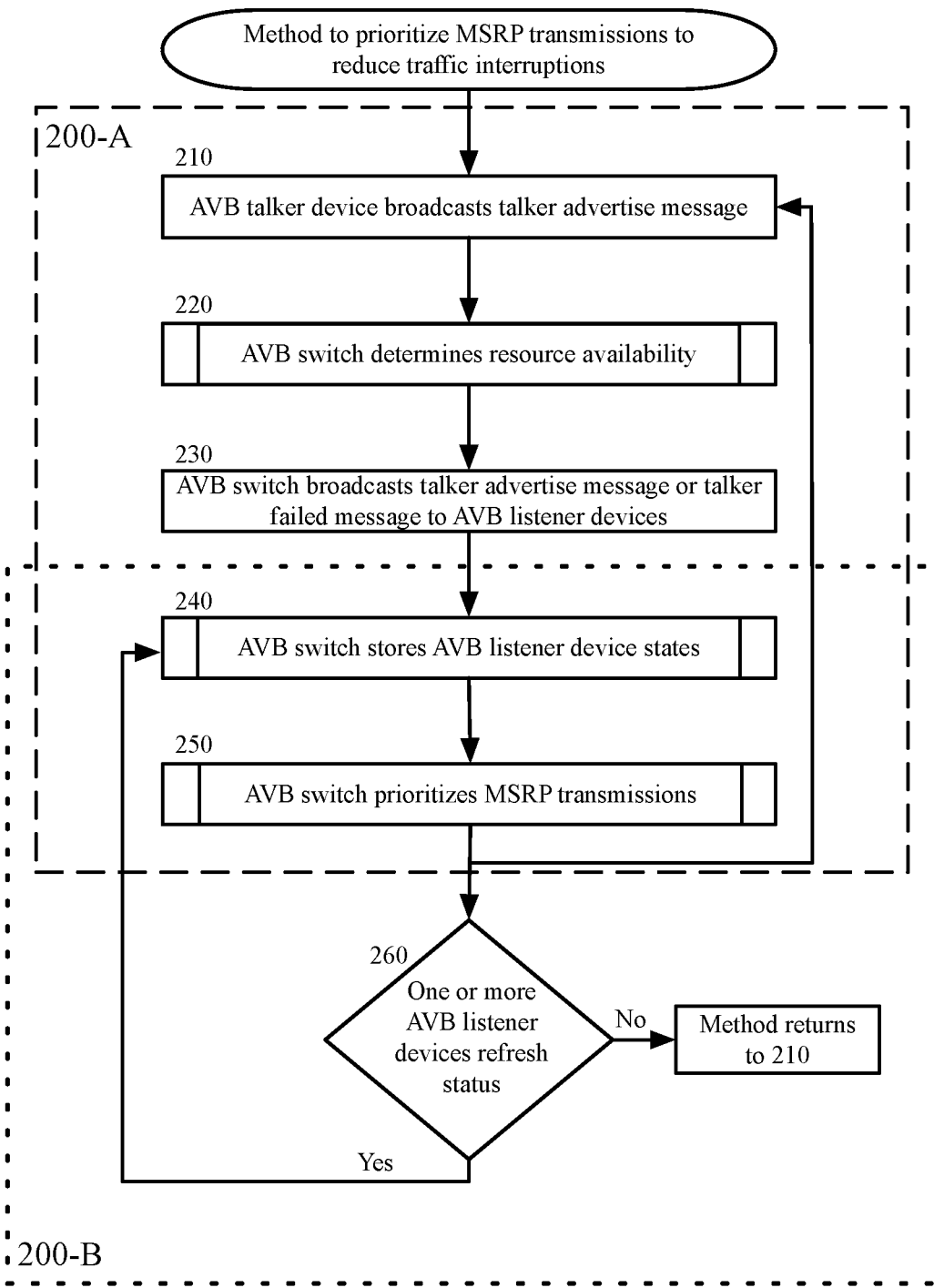
FIG. 2 is a block flow diagram depicting a method to prioritize Multiple Stream Reservation Protocol ("MSRP") transmissions to reduce traffic interruptions, in accordance with certain examples.

FIG. 2 is a block flow diagram depicting a method 200 to prioritize Multiple Stream Reservation Protocol ("MSRP") transmissions to reduce traffic interruptions, in accordance with certain examples. As depicted in FIG. 2, FIG. 2 comprises two sub-routines: sub-routine 200-A and sub-routine 200-B. Sub-routine 200-A and sub-routine 200-B execute simultaneously with each other and independently of each other as will be described herein. Sub-routine 200-A comprises blocks 210-250 with the sub-routine returning to block 210 from block 250. As will be described, sub-routine 200-A is directed to steps to prioritize a transmission from an AVB talker device 150 to AVB listener devices 170. Sub-routine 200-A repeats upon the completion of block 250. Sub-routine 200-B comprises blocks 240-260 (overlapping with sub-routine 200-A) with the sub-routine returning to either block 210 or block 240. Sub-routine 200-B is directed to the steps required for an AVB listener device 170 to refresh a device status. The decision block 260 directs the sub-routine 200-B to loop to either block 210 or block 240.

For sub-routine 200-A, in block 210, an AVB talker device 150 broadcasts a talker advertise message. In the following example, a single AVB talker device 150 broadcasts a single talker advertise message. However, in a deployment of AVB network system 100, multiple AVB talker devices 150 may each transmit multiple talker advertise messages. The talker advertise message broadcast is intended for every AVB listener device 170 within AVB network system 100. The talker advertise message for each of the multiple talker devices 150 are re-broadcast throughout the AVB network system 100 at determined intervals consistent with IEEE.802.1 AVB standards, as indicated by the loop from block 250 to block 210 of sub-routine 200-A.

A talker advertise message is a MSRP protocol data unit ("PDU") packet comprising an attribute associated with AVB talker device 150. The talker advertise message represents the capability and intention of a particular AVB talker device 150 to source an audio video ("AV") stream that is described in the attribute. In an example, the attribute is comprised of a stream identification ("StreamID"), data frame parameters, traffic specification, priority of the stream, and a worst-case latency. The StreamID comprises eight octets to identify the stream, which include a media access control ("MAC") address associated with the particular AVB talker device 150 and a unique identifier to differentiate the particular stream advertised from other streams sourced by the particular AVB talker device 150. The traffic specification comprises a maximum frame size and a number of frames that the AVB talker device 150 will produce per class measurement interval.

In block 220, AVB switch 110 determines resource availability. Block 220 is described in greater detail herein with reference to the method 220 of FIG. 3.

Figure 3:
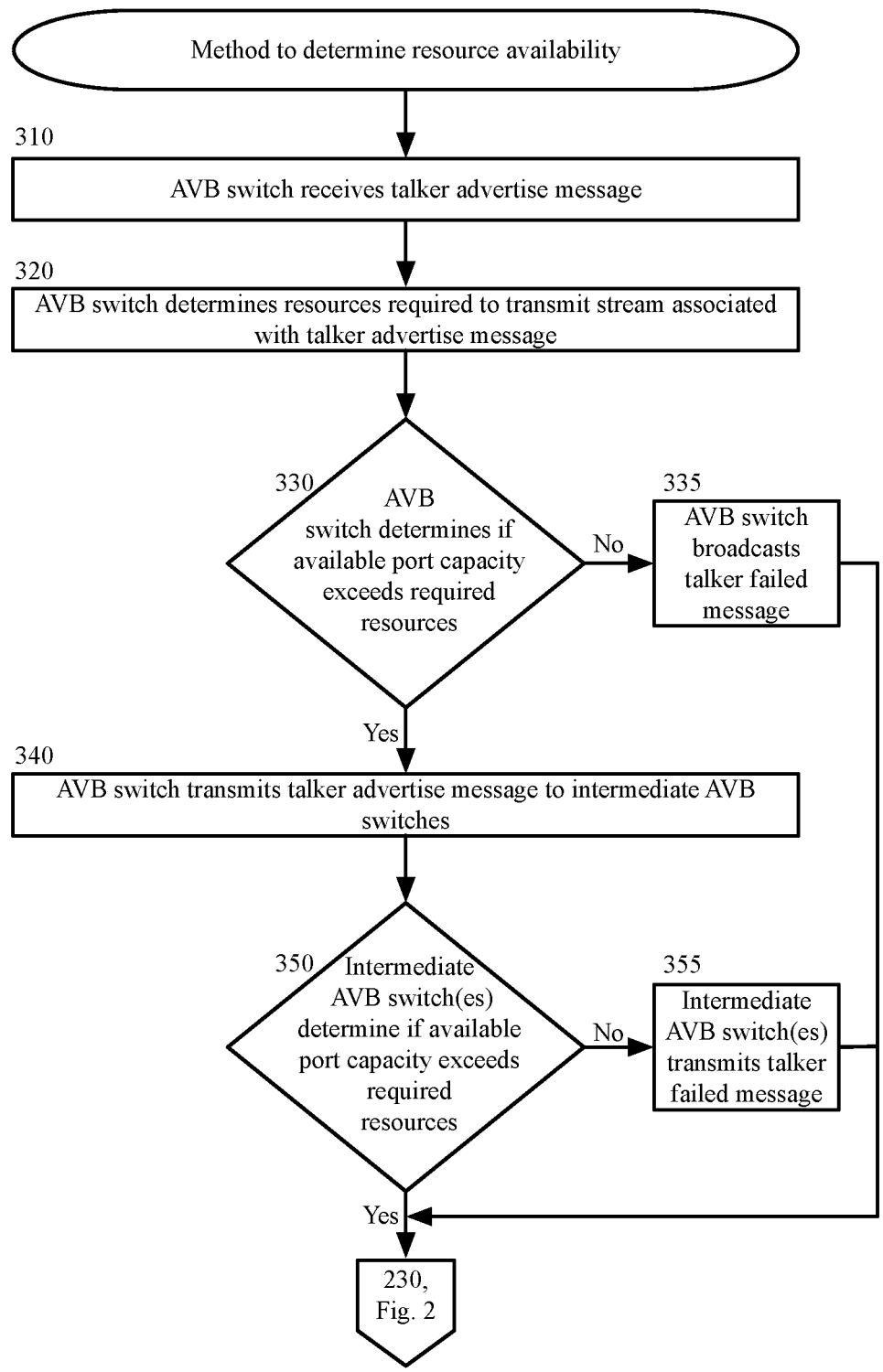
FIG. 3 is a block flow diagram depicting a method to determine resource availability, in accordance with certain examples.

FIG. 3 is a block flow diagram depicting a method 220 to determine resource availability, in accordance with certain examples.

In block 310, AVB switch 110 receives the talker advertise message from AVB talker device 150. In an example, AVB switch 110 stores each received talker advertise message in a database within the storage device of AVB switch 110. In an alternate example, the database is stored on VLAN server 130. The talker advertise message may be stored in any suitable storage location within AVB network system 100. Within the database, the talker advertise is stored in a queue, i.e. transmission queue, for each AVB listener device 170.

In block 320, AVB switch 110 determines the resources required to transmit the stream associated with the talker advertise message. AVB switch 110 extracts the traffic specification from the talker advertise message to determine the resources required to transmit the stream. In an example, the required resources are a bandwidth requirement of an available port on AVB switch 110 to transmit the stream.

In block 330, AVB switch 110 determines if an available port capacity of AVB switch 110 exceeds the required resources to transmit the stream associated with the talker advertise message. Table 1 below presents an example of the port capacities of AVB switch 110 and whether a port would be available to transmit the stream associated with the talker advertise message.

TABLE 1

(Giga bits per second ("Gbps"))

| Port | Port Capacity (Gbps) | Available AVB Port Capacity (Gbps) | Required Resources (block 320) (Gbps) | Available Port Capacity Exceeds Required Resources |
|------|------|------|------|------|
| 1 | 150 | 10 | 94 | No |
| 2 | 150 | 112 | 94 | Yes |
| 3 | 150 | 50 | 94 | No |
| 4 | 150 | 75 | 94 | No |
| 5 | 150 | 5 | 94 | No |
| 6 | 150 | 112 | 94 | Yes |
| 7 | 150 | Unavailable | 94 | N/A |
| 8 | 150 | 104 | 94 | No |

In the example presented in Table 1, each AVB switch 110 port has a port capacity of 150 Gbps. Each of ports 1 through 6 and port 8 may be used for AVB traffic. Port 7 is indicated as unavailable, as port 7 may be reserved for non-AVB network traffic. Each of ports 1 through 6 and 8 may currently be in use for AVB and/or non-AVB traffic. If the required resources determined in block 320 are 94 Gbps, ports 2 and 6 would have a port capacity that exceeds the required resources of 94 Gbps. As the AVB and non-AVB traffic changes in real-time, the available AVB port capacity for each port of AVB switch 110 may change in real time. If the port capacity does not exceed the required resources, the method proceeds to block 335.

In block 335, AVB switch 110 broadcasts a talker failed message. A talker failed message represents the intention of an AVB talker device 150 to transmit a stream with a lack of a necessary resource being reserved at some point between the AVB talker device 150 and one or more of the AVB listener devices 170. The talker failed message is comprised of the same parameters as the talker advertise message with the addition of failure information. The failure information is a code indicating why the stream from the talker advertise message is not available. The failure information may also comprise an identifier associated with the AVB switch 110 where the port capacity was determined to be insufficient. From block 335, the method 220 returns to block 230 of FIG. 2.

Returning to block 330, if the port capacity exceeds the required resources, the method proceeds to block 340. In block 340, AVB switch 110 transmits the talker advertise message to one or more intermediate AVB switches 120. If the AVB network system 100 does not comprise any intermediate AVB switches 120, the method returns to block 230 of FIG. 2.

In block 350, each of the intermediate AVB switches 120 determines if the available port capacity of the AVB switch 120 exceeds the required resources to transmit the stream associated with the talker advertise message. If the port capacity does not exceed the required resources, the method proceeds to block 355.

In block 355, the intermediate AVB switch 120 transmits a talker failed message, as previously described in reference to block 335. From block 355, the method 220 returns to block 230 of FIG. 2.

Returning to block 350, if the available port capacity exceeds the required resources, each of the intermediate AVB switches 120 transmits the talker advertise message to any additional intermediate AVB switches 120 located between the current intermediate AVB switches 120 and the one or more AVB listener devices 170. The step within block 350 is repeated. If there are no additional intermediate AVB switches 120, the method returns to block 230 of FIG. 2.

In block 230, AVB switch 110 broadcasts the talker advertise message or the talker failed message to AVB listener devices 170. In an alternate example, one or more of the intermediate AVB switches 120 broadcasts the talker advertise message or the talker failed message to AVB listener devices 170 connected to each intermediate AVB switch 120. The method proceeds to block 240.

In block 240, sub-routine 200-A and sub-routine 200-B begin executing simultaneously. In block 240, AVB switch 110 stores AVB listener device 170 states. Block 240 is described in greater detail herein with reference to the method 240 of FIG. 4.

Figure 4:
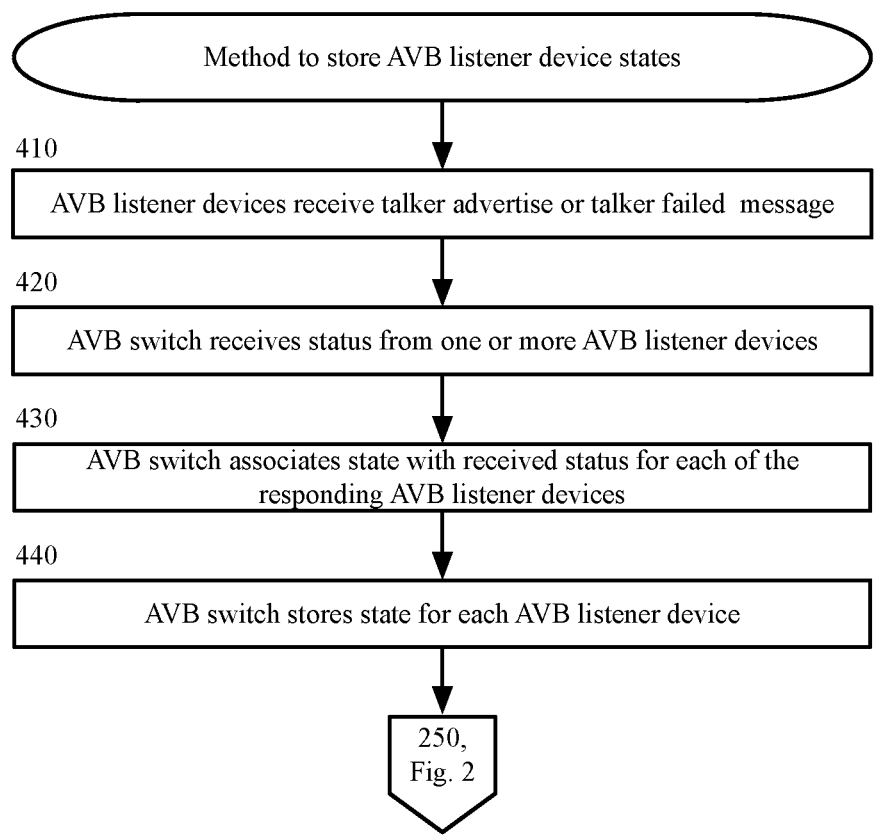
FIG. 4 is a block flow diagram depicting a method to store AVB listener device states, in accordance with certain examples.

FIG. 4 is a block flow diagram depicting a method to store AVB listener device 170 states, in accordance with certain examples.

In block 410, AVB listener devices 170 receive a talker advertise message or a talker failed message. One or more of the AVB listener devices 170 may generate a message comprising listener attributes in response to receiving either the talker advertise message or the talker failed message. The listener attributes represent a status in terms of intention and ability of the one or more AVB listener devices 170 to consume or subscribe to a particular stream. In an example, the listener attribute may comprise a subtype indicating a status of the AVB listener device 170 and a StreamID. The StreamID may comprise the MAC address of the AVB talker device 150 and the MAC address of the particular AVB listener device 170.

In block 420, AVB switch 110 receives a status from one or more AVB listener devices 170. In an example, AVB switch 110 may receive the status directly from each of the responding AVB listener devices 170 connected to AVB switch 110. In an alternate example, AVB switch 110 may receive the status from one of the intermediate AVB switches 120. The status represents the intention and the ability of each of the one or more listener devices 170 to consume or subscribe to a particular stream from a particular AVB talker device 150. In an example, an AVB listener device 170 may transmit a "ready" status indicating that the device intends to subscribe to the stream and resources are available for the stream. An AVB listener device 170 may transmit a "de-register" status indicating that the device no longer intends to subscribe to a previously subscribed stream. The "de-register" status may be associated with the particular AVB talker device 150 transmitting the talker advertise message of the present example or the "de-register" status may be associated with a different AVB talker device 150 within AVB network system 100. An AVB listener device 170 may transmit an "asking failed" status indicating that the device intends to subscribe to the stream but resources were not determined to be presently available for the stream. An AVB listener device 170 may transmit any other suitable status representing an intention and ability to subscribe to a particular stream.

In block 430, AVB switch 110 associates a state with each received status. In an example, a state may be either an "active" state or an "in-active" state. An active state would be associated with a "ready" status, or any other status indicating that an AVB listener device 170 intends to subscribe to, or continue to subscribe to, a stream and resources are available for the stream. An in-active state would be associated with "de-register," "asking failed," a no reply from an AVB listener device 170, or any other status indicating that an AVB listener device 170 either does not intend to subscribe to a stream, does not intend to continue to subscribe to a stream, or resources are not presently available for the stream.

In block 440, AVB switch 110 stores the state for each AVB listener device 170. In an example, the AVB switch 110 stores the state for each AVB listener device 170 in a database within the storage device of AVB switch 110. In an alternate example, the database is stored on VLAN server 130. The states may be stored in any suitable storage location within the AVB network system 100. From block 440, the method returns to block 250 of FIG. 2.

In block 250, the AVB switch 110 prioritizes MSRP transmissions. Block 250 represents the completion of a first iteration of sub-routine 200-A. From block 250, sub-routine 200-A loops back to block 210 to repeat the method of sub-routine 200-A. Block 250 is described in greater detail herein with reference to the method 250 of FIG. 5.

Figure 5:
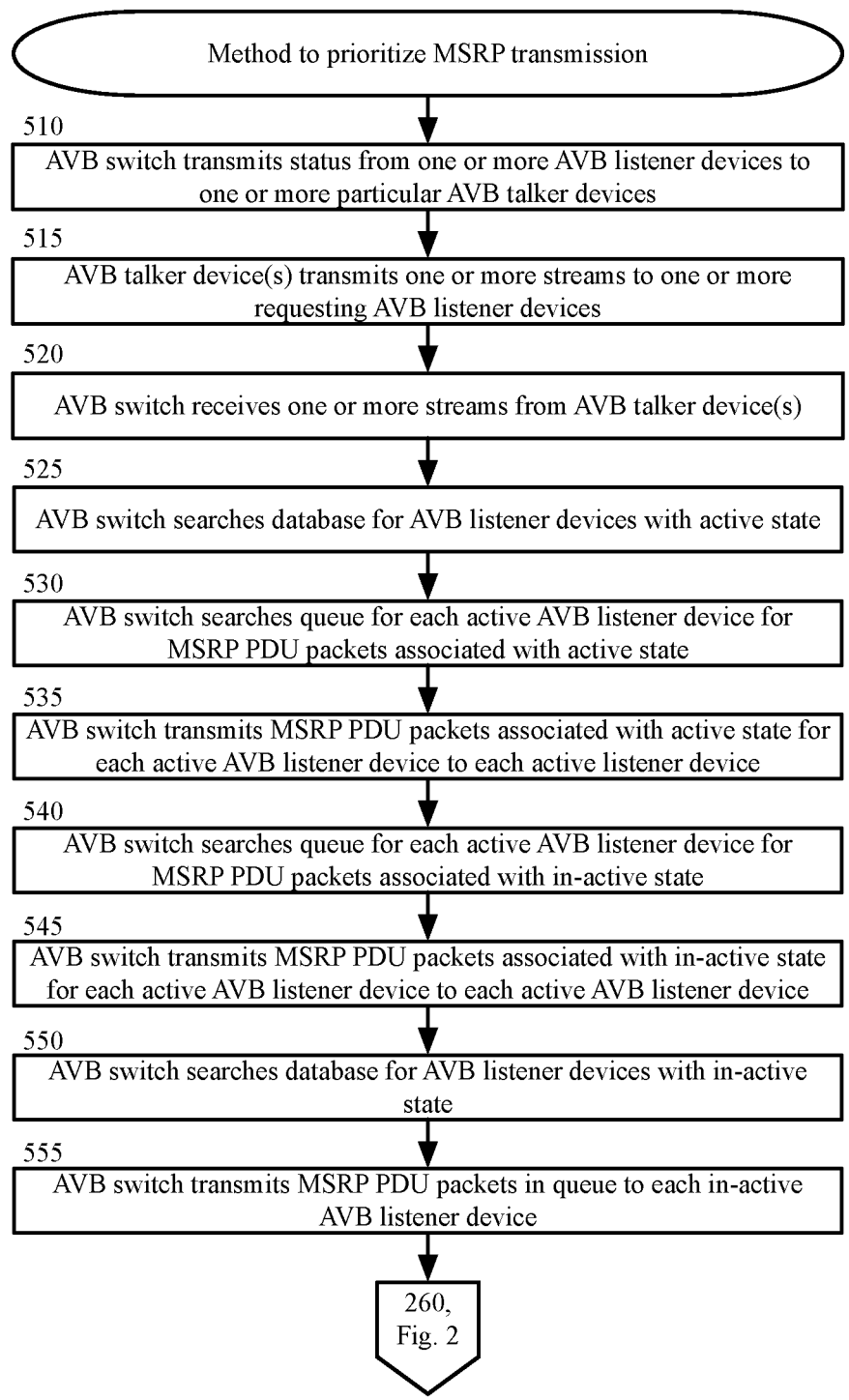
FIG. 5 is a block flow diagram depicting a method to prioritize MSRP transmissions, in accordance with certain examples.

FIG. 5 is a block flow diagram depicting a method to prioritize MSRP transmissions, in accordance with certain examples.

In block 510, AVB switch 110 transmits each status received from the one or more AVB listener devices 170 to the one or more particular AVB talker devices 150 associated with the status. The statuses were previously discussed in greater detail in block 420 of FIG. 4.

In block 515, the AVB talker device(s) 150 transmits one or more streams to the one or more requesting AVB listener devices 170. The one or more streams are transmitted to the one or more requesting AVB listener devices 170 via AVB switch 110 and intermediate AVB switch(es) 120.

In block 520, AVB switch 110 receives one or more streams from AVB talker device 150. For each AVB listener device 170 with a "ready" status or any other suitable status indicating the AVB listener device 170 intends to subscribe to, or continue to subscribe to, the one or more streams, the AVB talker device 150 transmits the stream as a MSRP PDU packet to each AVB listener device 170 via the AVB switch 110. The AVB switch 110 stores each stream for each AVB listener device 170 in a queue within the database of the storage device of the AVB switch 110. In an alternate example, the database is stored on VLAN server 130. The streams may be stored in any suitable storage location within the AVB network system 100.

In block 525, AVB switch 110 searches the database for AVB listener devices 170 with an active status. The status of AVB listener devices 170 were stored in the database as previously described herein in block 440 of FIG. 4.

In block 530, AVB switch 110 searches the queue for each active AVB listener device 170 (identified in block 530) for MSRP PDU packets associated with an active state. For example, MSRP PDU packets comprising a stream would be associated with an active state.

In block 535, AVB switch 110 transmits the MSRP PDU packets associated with an active state for each listener device 170 to each active listener device 170. Transmitting the MSRP PDU packets associated with an active state prioritizes the transmission above MSRP PDU packets associated with an in-active state.

In block 540, AVB switch 110 searches the queue for each active AVB listener device 170 for MSRP PDU packets associated with an in-active state.

In block 545, AVB switch 110 transmits the MSRP PDU packets associated with an in-active state for each active AVB listener device 170 to each active AVB listener device 170.

In block 550, AVB switch 110 searches the database for AVB listener devices 170 with an in-active status. The status of AVB listener devices 170 were stored in the database as previously described herein in block 440 of FIG. 4.

In block 555, AVB switch 110 transmits the MSRP PDU packets in queue to each in-active AVB listener device 170.

From block 555, the method returns to block 260 of FIG. 2. Sub-routine 200-A has looped back to block 210 to repeat the method of the sub-routine.

In block 260, sub-routine 200-B is executing independently of sub-routine 200-A. In block 260, AVB switch 110 determines whether one or more of the AVB listener devices 170 have refreshed the device status. In an example, one of more AVB listener devices 170 refreshes the device status at scheduled intervals. In the example, an AVB listener device 170 may refresh the device status every 2 ms, 10 ms, 50 ms, or any other suitable time period. In an example, to continue receiving a stream, an AVB listener device 170 may enter a replay mode and continue to transmit a "ready" status, which would not reflect a change in the status of the device. An AVB listener device 170 with a previous "ready" status may refresh the device status to "de-register." An AVB listener device 170 with a previous "asking failed" status may be able to subscribe to a stream as sub-routine 200-A is repeated and resources are determined to be available. The AVB listener device 170 may refresh the device status from "asking failed" to "ready." If one or more of the AVB listener devices 170 refreshes the device status, the method and sub-routine 200-B returns to block 240. If none of the AVB listener devices 170 within the AVB network system 100 refreshes a device status, the method returns to block 210. Sub-routines 200-A and 200-B continue to loop and repeat while AV streaming is active within AVB network system 100.

OTHER EXAMPLES

FIG. 6 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method performed at least partly by an intermediate device in a network, the method comprising:
   identifying a first source device that is configured to transmit a first traffic stream in the network;
   identifying a second source device that is configured to transmit a second traffic stream in the network;
   determining that the first device has one or more first receiving devices that are subscribed to receive the first traffic stream from the first source device;
   determining that the second source device does not have any subscribed receiving devices;
   receiving a first advertisement packet from the first source device that advertises first attributes associated with the first traffic stream, wherein the first attributes indicate an availability of the first traffic stream or a third traffic stream associated with the first device;
   receiving a second advertisement packet from the second source device that advertises second attributes associated with the second traffic stream, wherein the second attributes indicate an availability of the second traffic stream or a fourth traffic stream associated with the second device; and
   prioritizing transmission of the first advertisement packet over the second advertisement packet based at least in part on the first source device having one or more first receiving devices that are subscribed and the second source device not having any subscribed receiving devices.

2. The method of claim 1, wherein prioritizing the transmission of the first advertisement packet over the second advertisement packet includes:
   transmitting the first packet to the one or more first receiving devices; and
   dropping the second advertisement packet.

3. The method of claim 1, wherein the first advertisement packet and the second advertisement packet are each multiple stream reservation protocol (MSRP) protocol data unit (PDU) packets.

4. The method of claim 1, wherein:
   the first source device and second source device are talker devices in an audio/video bridging network system; and the one or more first receiving devices are one or more listening devices in the audio/video bridging network system.

5. The method of claim 1, further comprising:
receiving a response message from the one or more first receiving devices indicating that the one or more first receiving devices have an intent to subscribe to receive the first traffic stream in the network; and
associating an active status with each of the one or more first receiving devices that indicated the intent to subscribe to receive the first traffic stream.

6. The method of claim 1, wherein prioritizing the transmission of the first advertisement packet over the second advertisement packet includes:
transmitting the first packet to the one or more first receiving devices at a first time; and
transmitting the second advertisement packet at a second time subsequent the first time.

7. The method of claim 1, wherein:
the one or more first receiving devices are one or more of a speaker, a video screen, a monitor, or a television; and
the first source device is one or more of a microphone or a video camera.

8. An intermediate device in a network, the intermediate device comprising:
one or more processors; and
one or more non-transitory computer-readable media storing computer-executable instructions that, when executed by the one or more processors, cause the one or more processors to perform operations comprising:
identifying a first source device that is configured to transmit a first traffic stream in the network;
identifying a second source device that is configured to transmit a second traffic stream in the network;
determining that the first device has first receiving devices that are subscribed to receive the first traffic stream from the first source device;
determining that the second device has second receiving devices that are subscribed to receive the second traffic stream from the second source device;
determining that a first number of the first receiving devices is greater than a second number of the second receiving devices;
receiving a first advertisement packet from the first source device that advertises first attributes associated with the first traffic stream, wherein the first attributes indicate an availability of the first traffic stream or a third traffic stream associated with the first device;
receiving a second advertisement packet from the second source device that advertises second attributes associated with the second traffic stream, wherein the second attributes indicate an availability of the second traffic stream or a fourth traffic stream associated with the second device; and
prioritizing transmission of the first advertisement packet over the second advertisement packet based at least in part on the first number of the first receiving devices being greater than the second number of the second receiving devices.

9. The intermediate device of claim 8, wherein prioritizing the transmission of the first advertisement packet over the second advertisement packet includes:
transmitting the first packet to the one or more first receiving devices; and
dropping the second advertisement packet.

10. The intermediate device of claim 8, wherein the first advertisement packet and the second advertisement packet are each multiple stream reservation protocol (MSRP) protocol data unit (PDU) packets.

11. The intermediate device of claim 8, wherein:
the first source device and second source device are talker devices in an audio/video bridging network system; and
the first receiving devices include one or more listening devices in the audio/video bridging network system.

12. The intermediate device of claim 8, the operations further comprising:
receiving a response message from the first receiving devices indicating that the first receiving devices have an intent to subscribe to receive the first traffic stream in the network; and
associating an active status with each of the first receiving devices that indicated the intent to subscribe to receive the first traffic stream.

13. The intermediate device of claim 8, wherein prioritizing the transmission of the first advertisement packet over the second advertisement packet includes:
transmitting the first packet to the one or more first receiving devices at a first time; and
transmitting the second advertisement packet at a second time subsequent the first time.

14. The intermediate device of claim 8, wherein:
the first receiving devices are one or more of a speaker, a video screen, a monitor, or a television; and
the first source device is one or more of a microphone or a video camera.

15. A system comprising:
one or more processors; and
one or more non-transitory computer-readable media storing computer-executable instructions that, when executed by the one or more processors, cause the one or more processors to perform operations comprising:
identifying a first source device that is configured to transmit a first traffic stream in a network;
identifying a second source device that is configured to transmit a second traffic stream in the network;
determining that the first source device has first receiving devices that are subscribed to receive the first traffic stream from the first source device;
determining that the second source device has second receiving devices that are subscribed to receive the second traffic stream from the second source device;
determining that a first number of the first receiving devices is greater than a second number of the second receiving devices;
receiving a first advertisement packet from the first source device that advertises first attributes associated with the first traffic stream, wherein the first attributes indicate an availability of the first traffic stream or a third traffic stream associated with the first device;
receiving a second advertisement packet from the second source device that advertises second attributes associated with the second traffic stream, wherein the second attributes indicate an availability of the second traffic stream or a fourth traffic stream associated with the second device; and
prioritizing transmission of the first advertisement packet over the second advertisement packet based at least in part on the first number of the first receiving devices being greater than the second number of the second receiving devices.

16. The system of claim 15, wherein prioritizing the transmission of the first advertisement packet over the second advertisement packet includes:
- transmitting the first packet to the one or more first receiving devices; and
- dropping the second advertisement packet.

17. The system of claim 15, wherein the first advertisement packet and the second advertisement packet are each multiple stream reservation protocol (MSRP) protocol data unit (PDU) packets.

18. The system of claim 15, wherein:
- the first source device and second source device are talker devices in an audio/video bridging network system; and
- the first receiving devices are one or more listening devices in the audio/video bridging network system.

19. The system of claim 15, the operations further comprising:
- receiving a response message from the first receiving devices indicating that the first receiving devices have an intent to subscribe to receive the first traffic stream in the network; and
- associating an active status with each of the first receiving devices that indicated the intent to subscribe to receive the first traffic stream.

20. The system of claim 15, wherein prioritizing the transmission of the first advertisement packet over the second advertisement packet includes:
- transmitting the first packet to the one or more first receiving devices at a first time; and
- transmitting the second advertisement packet at a second time subsequent the first time.

* * * * *